(12) United States Patent
Morton et al.

(10) Patent No.: US 11,720,729 B2
(45) Date of Patent: Aug. 8, 2023

(54) METHODS FOR AUTOMATED HARDWARE SYSTEM SYNTHESIS

(71) Applicant: Shenzhen Chipuller Chip Technology Co., Ltd., Shenzhen (CN)

(72) Inventors: Danielle Morton, Mountain View, CA (US); Rick Yan, Mountain View, CA (US)

(73) Assignee: Shenzhen Chipuller Chip Technology Co., LTD., Shenzhen (CN)

( * ) Notice: Subject to any disclaimer, the term of this patent is extended or adjusted under 35 U.S.C. 154(b) by 0 days.

(21) Appl. No.: 17/804,071

(22) Filed: May 25, 2022

(65) Prior Publication Data

US 2022/0292242 A1 Sep. 15, 2022

Related U.S. Application Data

(63) Continuation of application No. 17/062,311, filed on Oct. 2, 2020, now Pat. No. 11,379,642, which is a continuation of application No. 16/153,614, filed on Oct. 5, 2018, now Pat. No. 10,810,336.

(60) Provisional application No. 62/569,412, filed on Oct. 6, 2017.

(51) Int. Cl.
*G06F 30/327* (2020.01)
*G06F 30/398* (2020.01)
*G06F 111/04* (2020.01)
*G06F 111/20* (2020.01)

(52) U.S. Cl.
CPC .......... *G06F 30/327* (2020.01); *G06F 30/398* (2020.01); *G06F 2111/04* (2020.01); *G06F 2111/20* (2020.01)

(58) Field of Classification Search
CPC ............................. G06F 30/327; G06F 30/398
USPC ......................................................... 716/103
See application file for complete search history.

(56) References Cited

U.S. PATENT DOCUMENTS

| | | | |
|---|---|---|---|
| 7,225,423 B2 | 5/2007 | Bhattacharya et al. | |
| 7,302,667 B1 | 11/2007 | Pritchard | |
| 8,296,696 B1 | 10/2012 | Chiu et al. | |
| 8,407,643 B1 | 3/2013 | Atsatt | |
| 9,703,899 B1 * | 7/2017 | Mattela | G06F 30/39 |
| 10,515,177 B1 * | 12/2019 | Ruehl | G06F 30/392 |
| 10,810,336 B2 | 10/2020 | Morton et al. | |
| 2004/0123263 A1 * | 6/2004 | Chen | G06F 30/394 |
| | | | 716/130 |
| 2009/0055784 A1 | 2/2009 | Izumi et al. | |

(Continued)

OTHER PUBLICATIONS

Final Office Action notified Apr. 20, 2020 for U.S. Appl. No. 16/153,614.

(Continued)

*Primary Examiner* — Suchin Parihar
(74) *Attorney, Agent, or Firm* — Mughal Gaudry & Franklin PC (57) ABSTRACT

Described is a method comprising a processing, an establishing, and/or a determining. In the processing, an inputted capabilities list including one or more hardware design capabilities may be processed. In the establishing, one or more candidate components for the one or more hardware design capabilities may be established. In the determining, a set of unique candidate netlists capable of satisfying the one or more hardware design capabilities may be determined, the set of unique candidate netlists being based upon the set of candidate components.

20 Claims, 8 Drawing Sheets

(56) References Cited

U.S. PATENT DOCUMENTS

| | | |
|---|---|---|
| 2013/0125072 A1 | 5/2013 | Newcomb |
| 2013/0181257 A1* | 7/2013 | Ngai ................... H01L 25/0657 |
| | | 257/209 |
| 2018/0067877 A1* | 3/2018 | Balkan ................ G06F 13/1642 |
| 2019/0165935 A1* | 5/2019 | Tehranipoor .............. H04L 9/14 |
| 2020/0104459 A1* | 4/2020 | Tong ..................... G06F 30/392 |
| 2020/0134108 A1* | 4/2020 | Possignolo ........... G06F 30/392 |

OTHER PUBLICATIONS

Non-Final Office Action notified Aug. 22, 2019 for U.S. Appl. No. 16/153,614.
Non-Final Office Action notified Jan. 14, 2020 for U.S. Appl. No. 16/153,614.
Non-Final Office Action notified Nov. 16, 2021 for U.S. Appl. No. 17/062,311.
Notice of Allowance notified Jul. 20, 2020 for U.S. Appl. No. 16/153,614.
Notice of Allowance notified Mar. 16, 2022 for U.S. Appl. No. 17/062,311.

* cited by examiner

METHODS FOR AUTOMATED HARDWARE SYSTEM SYNTHESIS

CLAIM FOR PRIORITY

This application is a continuation of, and claims priority to, U.S. patent application Ser. No. 17/062,311, filed Oct. 2, 2020, issued as U.S. Pat. No. 11,379,642, on Jul. 5, 2022, which is a continuation of, and claims priority to, U.S. patent application Ser. No. 16/153,614, filed Oct. 5, 2018, issued as U.S. Pat. No. 10,810,336, on Oct. 20, 2020, which claims the benefit of priority to U.S. Provisional Patent Application No. 62/569,412 filed Oct. 6, 2017, which is incorporated by reference in its entirety.

BACKGROUND

Using a programmable silicon interposer as a substrate for designing and manufacturing new wearable devices or Internet-of-Things (IoT) devices may facilitate rapid fabrication of new devices from circuit schematics. The time spent developing schematics for a new device may accordingly become a larger fraction of the overall time needed to deliver new systems, and may thus raise the value of producing these new schematics more quickly.

Meanwhile, the most common errors in hardware design may include simple errors such as forgotten wires or misplaced wires. Typically, these errors may be single-points-of-failure, and may result in multiple re-spins of a board design. Good hardware engineers may draw on their own experience with known chips in previously used wiring diagrams in order to minimize or avoid costs in time, money, or both. Still, when designing numerous systems in parallel, the time and effort spent on design may become costly, and potentially unmanageable.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Using programmable silicon interposers as substrates for designing and manufacturing new wearable devices or Internet-of-Things (IoT) devices may facilitate rapid fabrication of new devices from circuit schematics. Meanwhile, common errors in hardware design (e.g., simple forgotten wires or misplaced wires) may be single-points-of-failure resulting in multiple re-spins of a board design. When designing numerous systems in parallel, the time and effort spent on design may become costly, and potentially unmanageable.

Disclosed herein are mechanisms and methods related to system design automation, verification, and validation for improved efficiency in hardware development, such as for IoT applications or wearable applications. Some embodiments may comprise automated Hardware System Synthesis (HSS) tools operable to generate one or more systems on programmable silicon interposers that may have specific features selected by a user. Some embodiments may comprise systems that may be verified by hardware checks prior to presenting results to a user, which may advantageously reduce design time and may mitigate various risks of hardware design. By reducing a degree of complexity of hardware design, an overall design space may advantageously be expanded to allow for more system designs in a shorter design cycle.

Discussed herein are various methods and mechanisms for HSS tools that may advantageously reduce risks of designing many systems in parallel, by providing designers with automatically generated baseline systems which may pass a given set of electrical checks (such as Electrical Rule Checker (ERC) checks) and physical checks (such as Design Rule Checker (DRC) checks). By automating initial system builds, simple wiring errors may be avoided. Moreover, pre-built systems may be stored in a common history table (e.g., a database) accessible to all designers, which may facilitate leveraging the experiences of other designers, and may in turn provide more creative choices with less attendant risk.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

When a new system is envisioned, a designer may start with a problem to be solved or an activity to help a user accomplish. This may lead to identifying certain actions a system may undertake in response either to input from a user or to changes in an environment which might come from sensors (e.g., time, location, temperature, and so on). Additional inputs may be provided by cloud-based sensors (e.g., a user's calendar or a user's email). Such inputs may in turn be used to identify one or more capabilities a system may be targeted to have, either as input (e.g., pertaining to a clock, a Global Positioning System (GPS) circuitry, an accelerometer, a gyroscope, a magnetometer, a thermometer, a hygrometer, a barometer, and so on) or to complete an activity (e.g., a microprocessor, a radio, a display, and/or a speaker). Finally, the capabilities may be used to design hardware (e.g., a schematic or a netlist) that may carry out one or more targeted tasks, and may be used to develop software to carry out the desired actions in a preferred order and in response to specified inputs.

Various designs may incorporate a programmable silicon interposer on which various components, or "chiplets," may be mounted. The programmable silicon interposer may be (or may include) an integrated circuit, while the chiplets may be (or may include) semiconductor dies, integrated circuits, and/or semiconductor chips. The chiplets may have smaller footprints (e.g., smaller x-dimensions and y-dimensions) than the interposer, and in various embodiments, multiple chiplets may fit within the footprint of the interposer.

The use of a programmable silicon interposer as a substrate for electrical connections may increase system design flexibility. However, the increase in design flexibility may result in a significant increase in verification and validation because of the proliferation of a set of systems being supported. Due to the manual nature of hardware design, this explosion in complexity may also lead to an increased probability of errors, which may in turn translate to longer verification cycles, validation cycles, and ultimately time-to-market.

To mitigate such effects, automation may be employed at various steps in the design process. The hardware design of a system may benefit significantly from automation. Design automation for hard-wired systems may be challenging at this step due to their relatively inflexibile natures. In addition, each system may be unique and may have its own set of targeted features or capabilities. The use of programmable silicon interposers may accordingly facilitate automation at this step, since various errors may be quickly corrected with relatively simple changes in software, and a plurality of systems supported on a substrate may share common attributes which might be leveraged for automating certain parts of the hardware design.

State of the art system design tools, such as High-Level Synthesis (HLS) tools, may require a complete description of the desired system behavior. From this description, the tools may then automatically generate schematic netlists and software that implements the desired behavior. This approach may be desirable when a completely new system is being developed, but might be impractical when the goal is to develop a system out of existing components for which complete behavioral models might not be available or provided.

As disclosed herein, an alternative path may be to use an HSS tool to synthesize a schematic netlist directly from a set of capabilities that a system (and thus its hardware) may be targeted to possess, instead of from behavioral models (e.g., a set of behaviors that the system may be targeted to carry out). This version of system design automation may advantageously work around a lack of behavioral models by focusing on wiring specifications for specific communication protocols (e.g., inter-component communication protocols, such as the Inter-Integrated Circuit (I2C) protocol and the Serial Peripheral Interface (SPI) protocol) and system power specifications.

An HSS tool may give communication protocols priority based upon the existence of firmware support. By supporting merely configurations or sub-configurations for which firmware already exists, software risk may be mitigated. A user may first specify a type of system by listing capabilities that the system may be targeted to provide: e.g., numbers and types of sensors, communication protocols, and so on. The HSS tool may then generate a set of functional systems that pass ERC and/or DRC, which an engineer may review. From these baseline designs, the engineer may modify specific areas to create a unique design. Such a design flow may thereby advantageously reduce the risk of simple errors in power connections or general communication schemes.

An HSS process may start with a list of capabilities that hardware may be targeted to provide. The starting point may also include one or more user preferences regarding components. For example, one preference may be that a system be built around a specific microprocessor System-on-a-Chip (SoC) (for which the designer may already have a significant amount of software, or may use certain sensors and/or interface types). Another preference may be that the system be built around a specific communication protocol (e.g., I2C, SPI, or another protocol).

Such parameters may then be used to generate a set of system schematic netlists which may satisfy all of the user preferences. Finally, each of those implementations (e.g., each generated system schematic netlist) may be checked against ERC rules and/or DRC rules.

In some embodiments, systems passing the various checks may be ranked, and top candidates may be presented to a user. Ranking may be based on a variety of attributes such as how well the system meets user preferences, cost, risk, size, and/or power.

Since systems may be synthesized from components for which complete behavioral descriptions may be potentially unavailable, some important capabilities may be extracted from a part's datasheet. (Presently, this extraction may be done by an engineer.) For each component (e.g., chip) potentially used by the system, key information may be entered into a database describing that particular component. This information may include a component's capabilities, electrical behavior, cost, and supported communication interfaces (including whether the interface is optional or non-optional). Once the database is populated with critical component information, a solution space may be defined for system types and corresponding functionalities for an automatic generation of systems from the given information.

Figure 1:
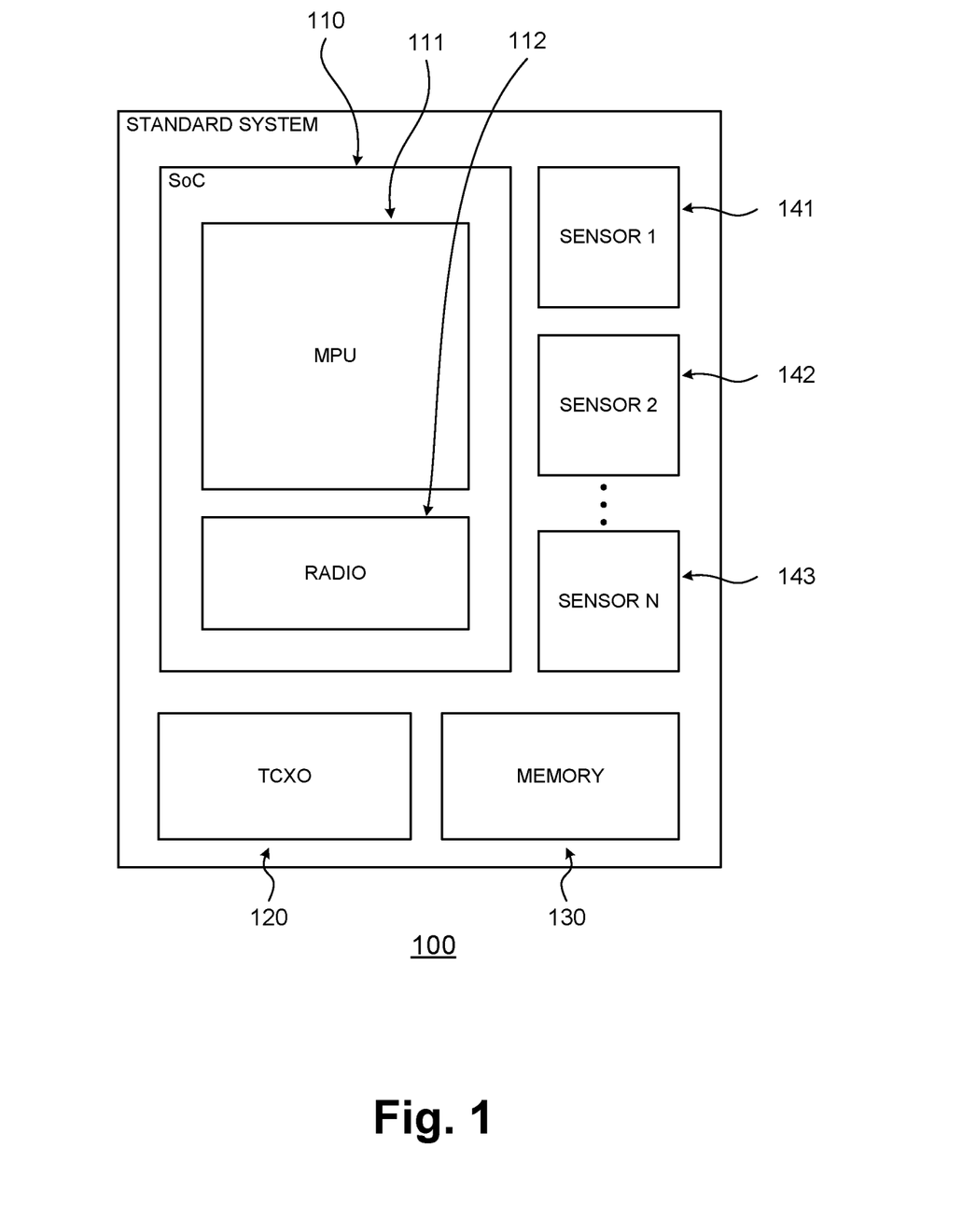
FIG. 1 illustrates an embedded system, in accordance with some embodiments of the disclosure.

Programmable silicon interposers may reduce a size of compact, power-efficient embedded system applications beyond what is possible with current Printed Circuit Board (PCB) technology. FIG. 1 illustrates an embedded system, in accordance with some embodiments of the disclosure. A system 100 may comprise an SoC 110, a microelectromechanical systems (MEMs) temperature-compensated crystal oscillator (TCXO) 120, and/or a memory 130 (which may be a nonvolatile memory, such as a flash memory). System 100 may also comprise one or more sensors, such as a first sensor 141, a second sensor 142, and so on, up to an Nth sensor 149. In various embodiments, SoC 110 may itself comprise a microprocessor unit (MPU) 111, which may have one or more processing cores, and/or a radio unit 112.

System 100 may accordingly comprise one or more of an MPU, a memory, a clock, numerous sensors, and a radio. In some embodiments, an MPU and a radio (e.g., a Bluetooth Low-Energy (BLE) circuitry) may be integrated directly onto the component as an SoC, and the memory and/or one or more of the sensors may be controlled by the SoC. In some embodiments, clock devices (e.g., a TXCO) may also be integrated into system 100, and may provide various clock signals to system 100. In various embodiments, one or more of MPU 111, radio 112, TCXO 120, memory 130, and/or first sensor 141 through Nth sensor 149 may be integrated into the same SoC die.

Various systems may be conceptually simplified as implementing one or more communication protocols having a master component (e.g., a "keystone" component) and multiple slave components.

Figure 2:
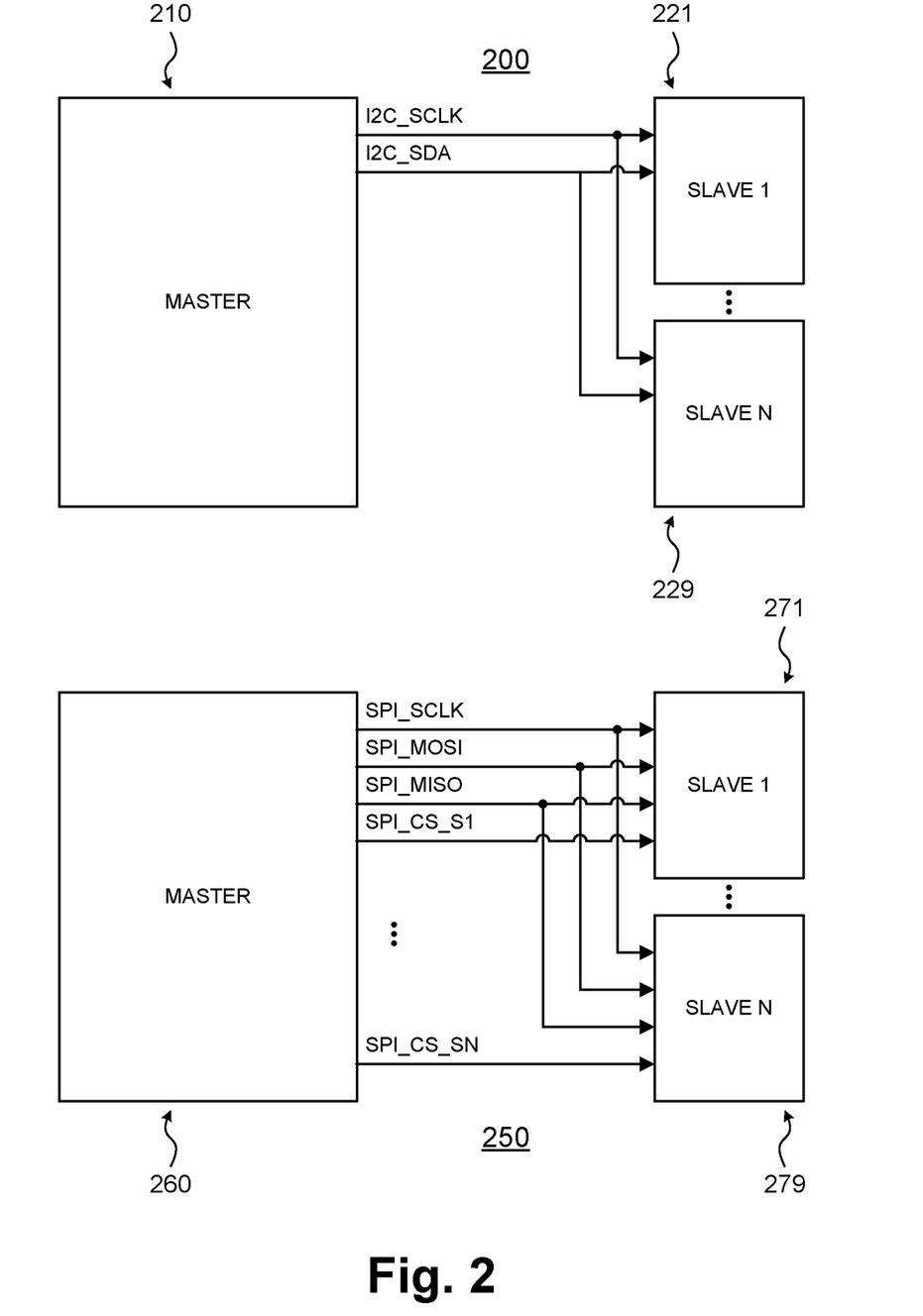
FIG. 2 illustrates embedded systems with masters and multiple slaves, in accordance with some embodiments of the disclosure.

FIG. 2 illustrates embedded systems with masters and multiple slaves, in accordance with some embodiments of the disclosure. A first system 200 may comprise an I2C master 210 and one or more I2C slaves, such as a first I2C slave 221 through an Nth I2C slave 229. I2C master 210 may output an I2C serial clock (SCLK) signal and an I2C serial data (SDA) signal. First I2C slave 221 through Nth I2C slave 229 may accept as inputs the I2C SCLK signal and the I2C SDA signal. First system 200 may accordingly implement an I2C bus between an I2C master and one or more I2C slaves.

A second system 250 may comprise an SPI master 260 and one or more SPI slaves, such as a first SPI slave 271 through an Nth SPI slave 279. Master 260 may output an SPI serial clock SCLK signal, an SPI master-out-slave-in (MOSI) signal, an SPI master-in-slave-out (MISO) signal, and/or a first SPI chip select (CS) signal through an Nth SPI CS signal (respectively corresponding with first SPI slave 271 through Nth SPI slave 279). First SPI slave 271 through Nth SPI slave 279 may accept as inputs the SPI SCLK signal, the SPI MOSI signal, and the SPI MISO signal. In addition, first SPI slave 271 may accept as input the first SPI CS signal, and so on, through Nth SPI slave 279, which may accept as input the Nth SPI CS signal. (For example, first SPI slave 271 through Nth SPI slave 279 may accept as input the respectively corresponding first SPI CS signal through Nth SPI CS signal.) Second system 250 may accordingly implement an SPI bus between an SPI master and one or more SPI slaves.

Components in various systems may communicate through various protocols, such as the I2C protocol and/or the SPI protocol. The I2C protocol and the SPI protocol may be advantageous initial-communication protocols, since (from a design perspective) the I2C protocol and/or the SPI protocol may advantageously be verified as having have supported firmware prior to being included in a designed system.

Once a user lists capabilities that a system may be targeted to provide, an HSS tool may be triggered (e.g., automatically triggered) to build all possible unique baseline systems corresponding with those capabilities. The HSS tool may also run system checks (e.g., ERC checks and/or DRC checks) to verify validity and whether all the targeted capabilities exist. The resulting systems and their checker results may then be presented to a user for review.

Figure 3A:
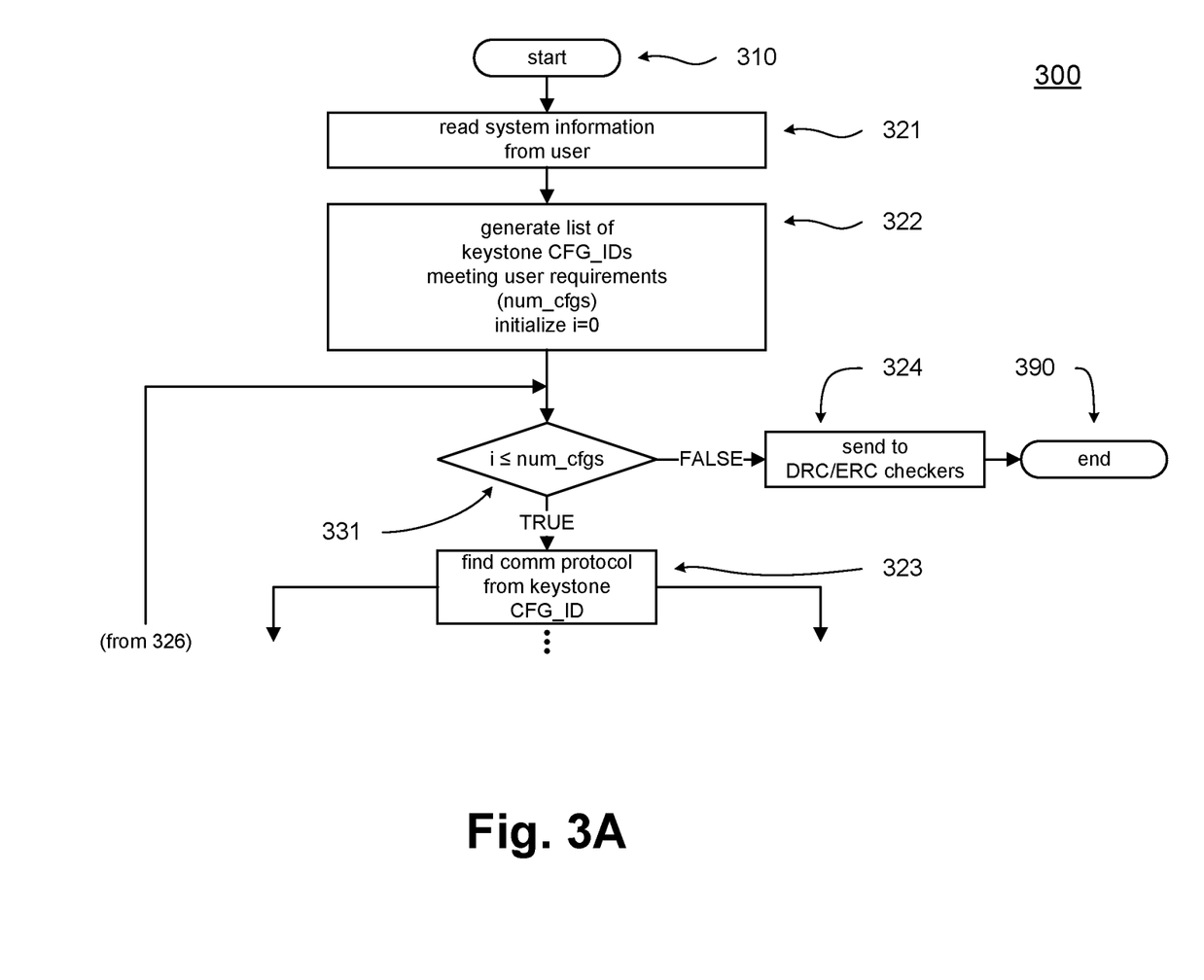
FIGS. 3A-3B illustrate a flow diagram for a Hardware System Synthesis (HSS) tool, in accordance with some embodiments of the disclosure.
Figure 3B:
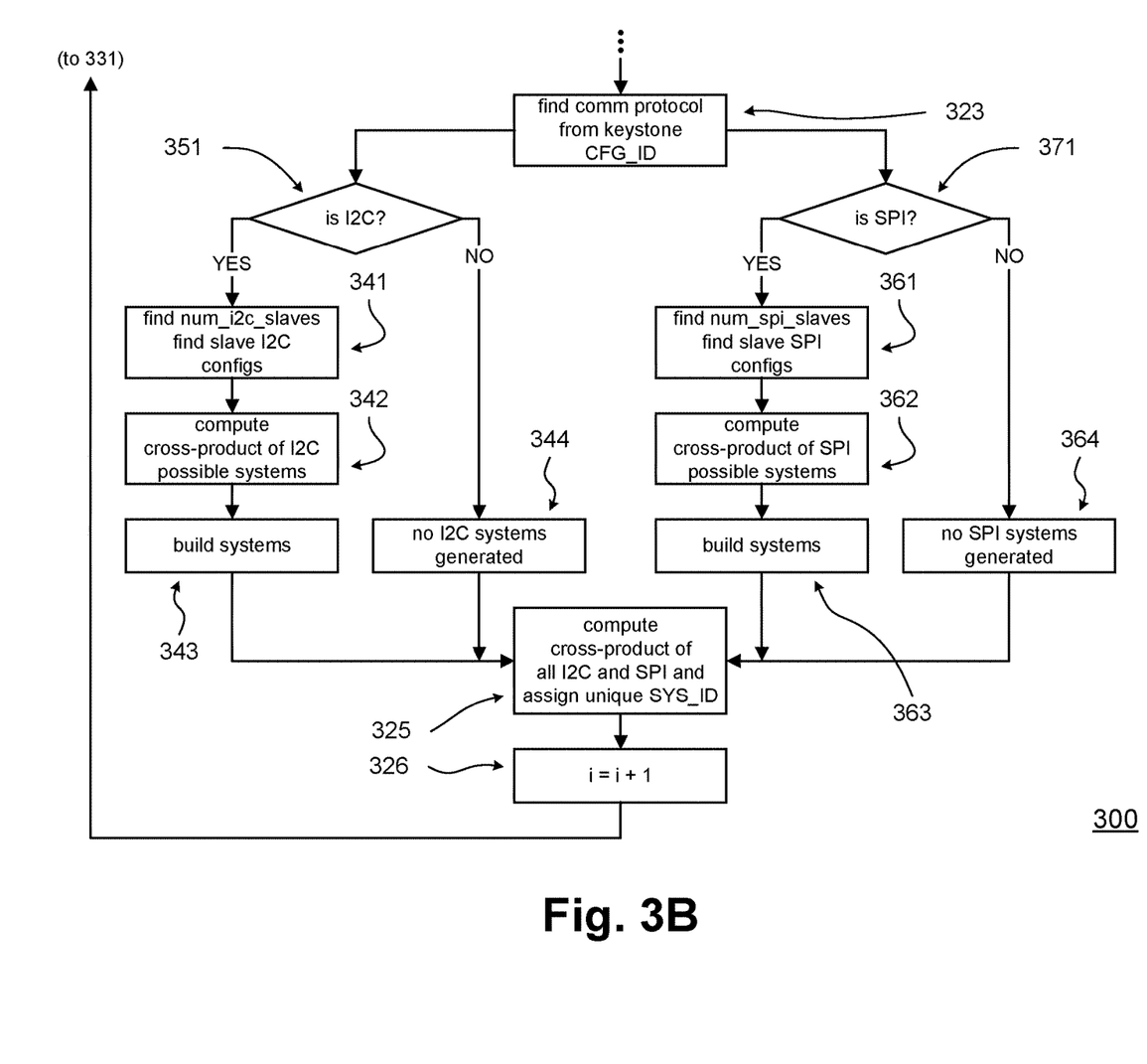

FIGS. 3A-3B illustrate a flow diagram for an HSS tool, in accordance with some embodiments of the disclosure. A flow 300 may comprise a start 310, a first portion 321, a second portion 322, a third portion 323, a fourth portion 324, a fifth portion 325, a sixth portion 326, a first condition 331, and/or an end 390.

Flow 300 may also have an I2C part comprising a first I2C condition 351, a first I2C portion 341, a second I2C portion 342, a third I2C portion 343, and/or a fourth I2C portion 344. Flow 300 may also have an SPI part comprising a first SPI condition 371, a first SPI portion 361, a second SPI portion 362, a third SPI portion 363, and/or a fourth SPI portion 364.

Following start 310, flow 300 may proceed to first portion 321. In first portion 321, system information may be read from a user (e.g., via a file or other input from the user). The system information may include, for example, specified capabilities of the desired system, such as the type of system, a number and/or type of sensors of the system, communication protocols used by the system, a desired microprocessor for the system, desired voltage supplies, desired clocking parameters, desired power supply support (e.g., battery charger support), power targets, delivery schedule impact, lab verification impact, product implementation history, cost, size, and/or user component preferences.

Then, in second portion 322, a list of candidate "keystone" configurations (CFG_IDs) that may meet the specified capabilities may be may be generated. A first parameter may then be set to the number of candidate keystone CFG_IDs (e.g., a "num_cfgs" parameter), and a second parameter to be used as an index (e.g., an "i" parameter) may be initialized to zero. Each keystone CFG_ID may be associated with a component capable of being a master to one or more of the communication protocols of the system (e.g., a component capable of being an I2C master and/or an SPI master). Flow 300 may then proceed to first condition 331.

In first condition 331, if the second parameter i is less than or equal to the first parameter num_cfgs, then flow 300 may proceed to third portion 323; otherwise, flow 300 may proceed to fourth portion 324. In third portion 323, one or more communication protocols to be supported for keystone CFG_ID number i may be determined (e.g., based upon the user's capabilities list and/or system information). Flow 300 may then proceed in parallel to its I2C part and/or its SPI part (e.g., based upon wither instances of the I2C protocol and/or the SPI protocol are present among the components of keystone CFG_ID number i). Alternatively, in some embodiments, flow 300 may proceed to its I2C part and its SPI part in series.

For the I2C part of flow 300, in first I2C condition 351, flow 300 may determine whether keystone CFG_ID number i includes any instances of the I2C protocol. If so, flow 300 may proceed through first I2C portion 341, second I2C portion 342, and third I2C portion 343; otherwise, flow 300 may proceed through fourth I2C portion 344.

In first I2C portion 341, a parameter pertaining to a number of slave I2C components of keystone CFG_ID number i ("num_i2c_slaves") may be found or determined. In second I2C portion 342, a "cross-product" of possible configurations of I2C-based components may be computed. The cross-product may be a list of all possible combinations of I2C-based components that are known to the HSS tool that may satisfy at least part of the user's capabilities list. In third I2C portion 343, systems (e.g., system descriptions) based upon the possible combinations of components identified in second I2C portion 342 may be built or generated, and flow 300 may then proceed to fifth portion 325. In contrast, in fourth I2C portion 344, no systems (e.g., system descriptions) are built or generated, and flow 300 may proceed directly to fifth portion 325.

Meanwhile, for the SPI part of flow 300, in first SPI condition 371, flow 300 may determine whether keystone CFG_ID number i includes any instances of the SPI protocol. If so, flow 300 may proceed through first SPI portion 361, second SPI portion 362, and third SPI portion 363; otherwise, flow 300 may proceed through fourth SPI portion 364.

In first SPI portion 361, a parameter pertaining to a number of slave SPI components of keystone CFG_ID number i ("num_spi_slaves") may be found or determined. In second SPI portion 362, a "cross-product" of possible configurations of SPI-based components may be computed. The cross-product may be a list of all possible combinations of SPI-based components that are known to the HSS tool that may satisfy at least part of the user's capabilities list. In third SPI portion 363, systems (e.g., system descriptions) based upon the possible combinations of components identified in second SPI portion 362 may be built or generated, and flow 300 may then proceed to fifth portion 325. In contrast, in fourth SPI portion 364, no systems (e.g., system descriptions) are built or generated, and flow 300 may proceed directly to fifth portion 325.

Accordingly, once both the I2C part and the SPI part have been completed for keystone CFG_ID number i, flow 300 may have identified both a set of all possible combinations of I2C-based components that are known to the HSS tool that may satisfy at least part of the user's capabilities list, and a set of all possible configurations of SPI-based components that are known to the HSS tool that may satisfy at least part of the user's capabilities list. (Note that flow 300 may have additional parts parallel to the I2C part and the SPI part, which may identify sets of all possible configurations of components based upon other, different communication protocols that may be known to the HSS to that may satisfy at least part of the user's capabilities list.)

Then, in fifth portion 325, flow 300 may compute another "cross-product" between the set of all possible configurations of I2C-based components (as identified by the I2C part) and/or the set of all possible configurations of SPI-based components (as identified by the SPI part). The cross-product may accordingly generate a set of unique systems spanning all possible combinations of I2C-based components and/or SPI-based components that may satisfy the I2C protocol instances and/or the SPI protocol instances of keystone CFG_ID number i. Once the cross-product of fifth portion 325 is computed (and, e.g., stored in a memory), flow 300 may proceed to sixth portion 326, in which the second, index parameter i may be incremented. Flow 300 may then return to first condition 331.

Once the second parameter i is no longer less than or equal to the first parameter num_cfgs—e.g., when all of the num_cfgs keystone CFG_IDs have been iterated through, and all possible configurations of I2C-based components and SPI-based components have been identified for each keystone CFG_ID—then flow 300 may have identified a set of systems spanning all possible combinations of slave-components and master-components capable of satisfying the system information read from the user (including, e.g., the list of capabilities targeted for the system). Flow 300 may proceed to fourth portion 324 (as mentioned above).

In fourth portion 324, the identified set of systems may be sent to DRC checkers, ERC checkers, and/or other checkers (e.g., thermal rule checkers, power rule checkers, timing checkers, noise checkers, and so on). Following fourth portion 324, flow 300 may proceed to end 390.

The flow diagram of FIGS. 3A-3B may pertain to user-driven HSS flows. In various embodiments, an HSS tool flow may be initiated or started by a user. Resulting systems and their corresponding checker results may be accumulated (e.g., by being placed in a queue) for a user to verify and approve prior to being storing in the history table (e.g., a database).

In some embodiments, an HSS tool flow may be triggered by an event such as the entry of a new component into the history table of the HSS tool. For example, a user may add a new component and its corresponding pin information into a database. Once submitted, the HSS tool may again be triggered to build all possible unique systems and run specified or predetermined checks, and resulting systems and their corresponding checker results may be accumulated for a user to verify and approve prior to being storing in the history table.

Figure 4A:
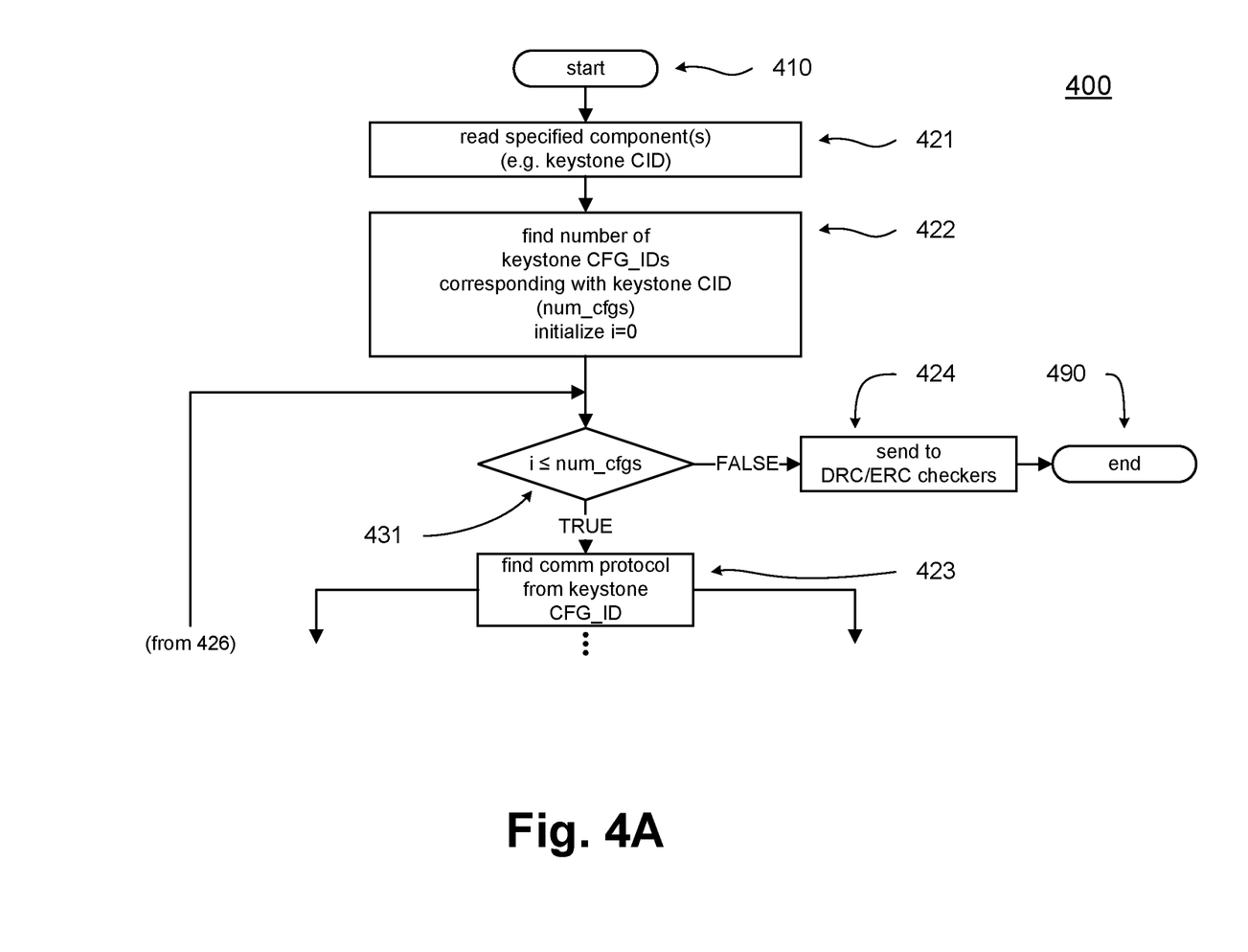
FIGS. 4A-4B illustrate a flow diagram for an HSS tool, in accordance with some embodiments of the disclosure.
Figure 4B:
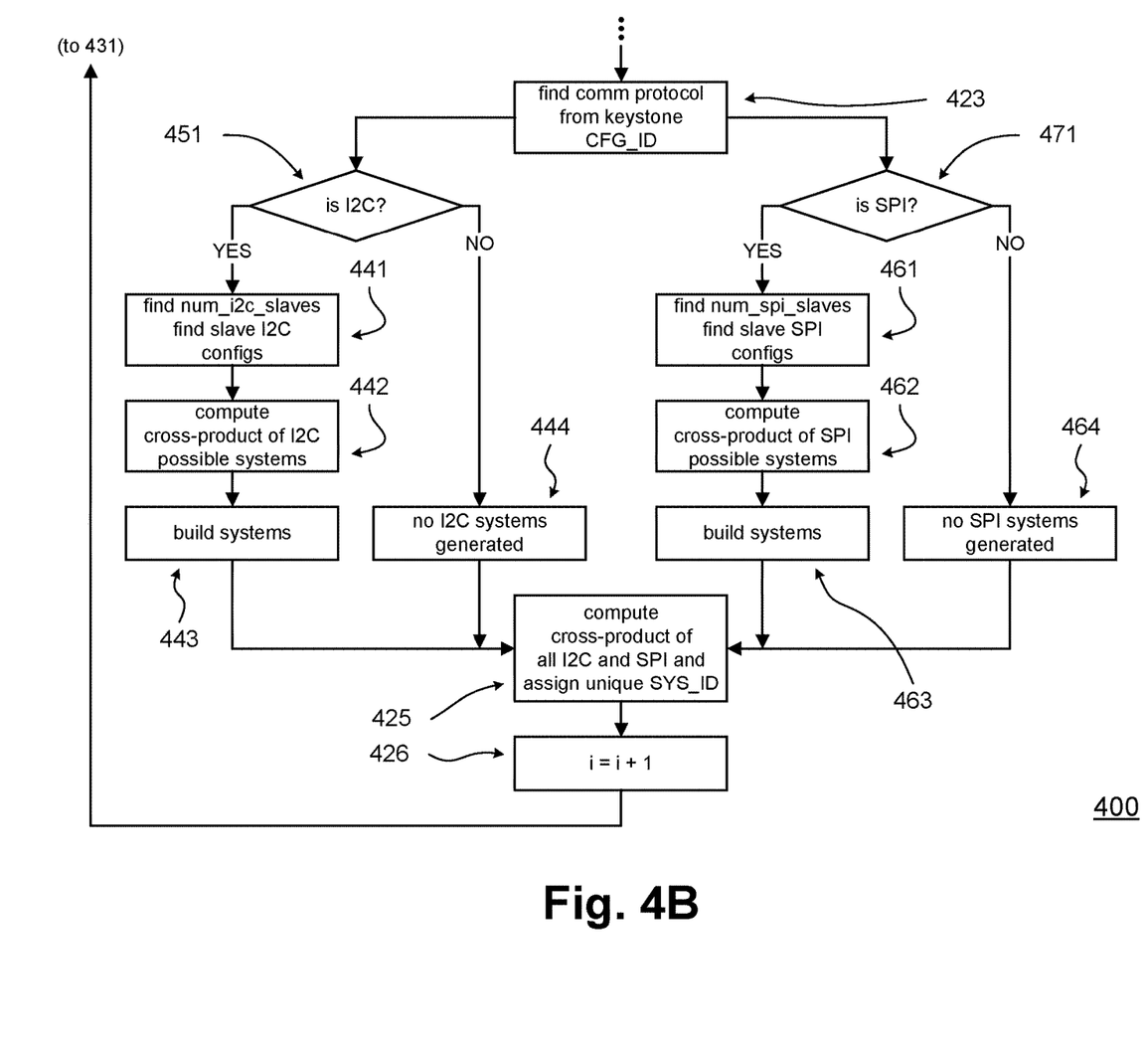

FIGS. 4A-4B illustrate a flow diagram for an HSS tool, in accordance with some embodiments of the disclosure. A flow 400 may comprise a start 410, a first portion 421, a second portion 422, a third portion 423, a fourth portion 424, a fifth portion 425, a sixth portion 426, a first condition 431, and/or an end 490.

Flow 400 may also have an I2C part comprising a first I2C condition 451, a first I2C portion 441, a second I2C portion 442, a third I2C portion 443, and/or a fourth I2C portion 444. Flow 400 may also have an SPI part comprising a first SPI condition 471, a first SPI portion 461, a second SPI portion 462, a third SPI portion 463, and/or a fourth SPI portion 464.

Flow 400 may be substantially similar to flow 300. In first portion 421, one or more component identifiers or chip identifiers (CIDs) may be specified by a user (such as a keystone CID, or a component serving as a master for a communication protocol), and in second portion 422, a number of keystone CFG_IDs corresponding with the one or more specified components may be generated, a first parameter may be set to the number of keystone CFG_IDs (e.g., a "num_cfgs" parameter), and a second parameter to be used as an index (e.g., an "i" parameter) may be initialized to zero. In some embodiments, one or more CIDs may be specified by a user, along with system information that may be specified by the user. Accordingly, in comparison with flow 300, flow 400 may support searching over a smaller solution-space to synthesize possible systems.

The flow diagram of FIG. 4 may pertain to database-initiated flows. This second flow may enable an HSS tool to build and check one or more systems overnight, storing the results in a history table (e.g., a database). In some embodiments, when a user wants to generate systems using the first flow (e.g., flow 300), the HSS tool may check the history table first to see if any of the built systems match the requirements of the user, which may advantageously reduce the tool's run time.

Although the actions in the flowchart with reference to FIGS. 3A-4B are shown in a particular order, the order of the actions can be modified. Thus, the illustrated embodiments can be performed in a different order, and some actions may be performed in parallel. Some of the actions and/or operations listed in FIGS. 3A-4B are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 3A-4B.

Moreover, in some embodiments, machine readable storage media may have executable instructions that, when executed, cause one or more processors to perform an operation comprising the methods of FIGS. 3A-4B. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 5:
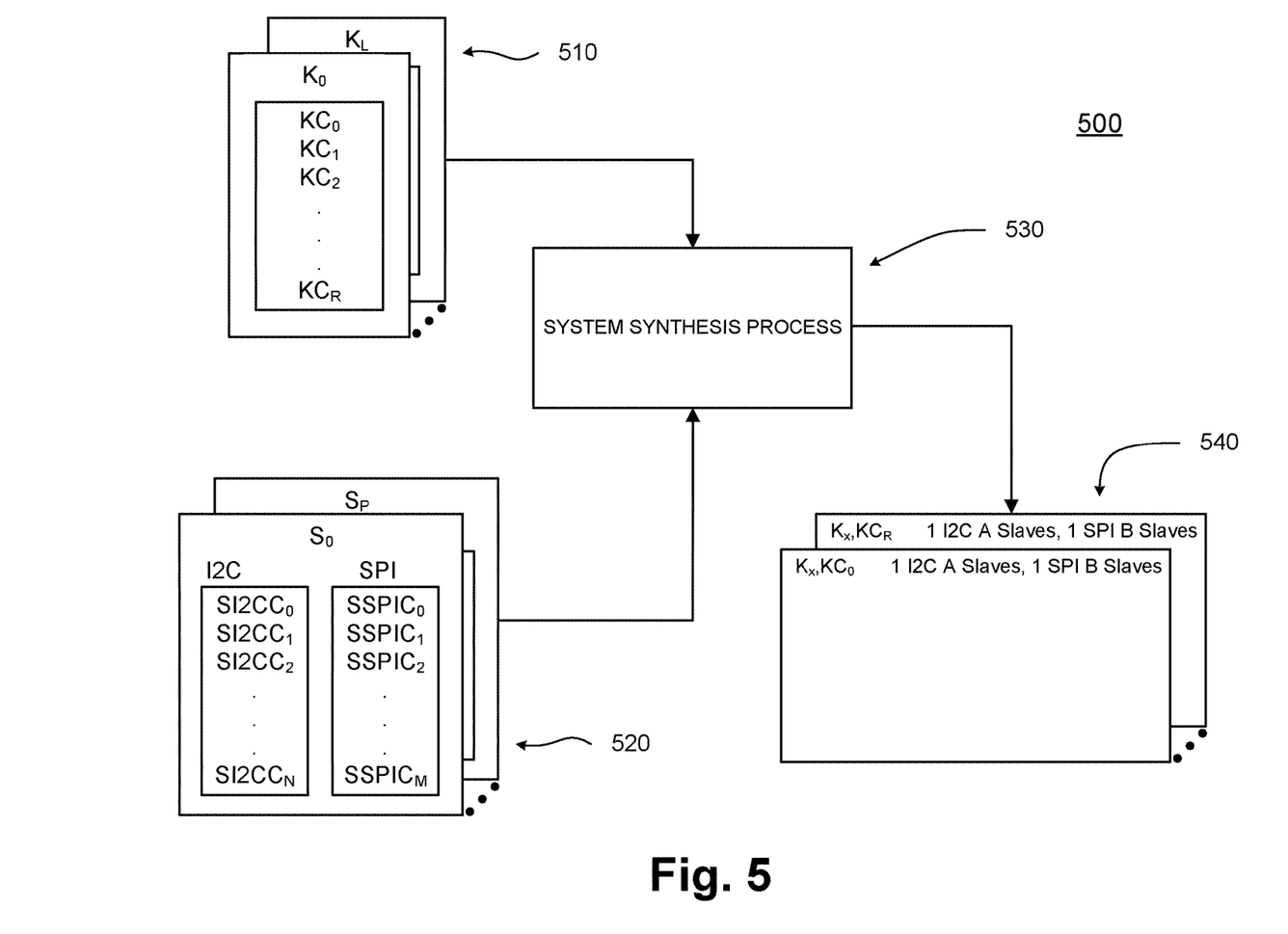
FIG. 5 illustrates a diagram of an HSS tool, in accordance with some embodiments of the disclosure.

FIG. 5 illustrates a diagram of an HSS tool, in accordance with some embodiments of the disclosure. An HSS tool 500 may have access to a database comprising a number L of keystone chiplets 510 (e.g., chiplets capable of being a master for one or more communication protocols) and a number P of slave chiplets 520.

For the L keystone chiplets 510 in the database, which may be numbered from $K_0$ through $K_L$, each keystone chiplet K may have a total number R of keystone CFG_IDs (e.g., each keystone chiplet K may have a number of configurations from $KC_0$ through $KC_R$). Each of keystone chiplets 510 (e.g., spanning $K_0$ through $K_L$) may also correspond to a unique keystone CID.

For the P slave chiplets 520 in the database, which may be numbered from $S_0$ through $S_P$, each slave chiplet may correspond with various I2C configurations and/or various SPI configurations. For example, each slave chiplet may correspond with a total number N of I2C configurations (e.g., each slave chiplet S may have a number of I2C configurations from $SI2CC_0$ through $SI2CC_N$). Similarly, each slave chiplet may correspond with a total number M of SPI configurations (e.g., each slave chiplet S may have a number of SPI configurations from $SSPIC_0$ through $SSPIC_M$).

A system synthesis process 530 having access to the database comprising both keystone chiplets $K_0$ through $K_L$ and slave chiplets $S_0$ through $S_P$ may then synthesize a number of systems based upon the keystone chiplets and slave chiplets.

Hardware synthesis process 530 may have a number of portions. In a first portion, system synthesis process 530 may choose a keystone CID (e.g., one of $K_0$ through $K_L$) and a keystone CFG_ID (e.g., from $KC_0$ through $KC_R$). In a second portion, the keystone CFG_ID may be decoded to determine configuration information (e.g., system information, such as system capabilities). In a third portion, a number Y of systems spanning the solution space may be generated. In some embodiments, Y may equal P choose A and B, where A may be a number of I2C components and B may be a number of SPI components. In a fourth portion, a unique system identification number (SYS_ID) may be assigned to each of the Y systems.

In a fifth portion, system synthesis process 530 may repeat the first portion through the fourth portion for the remaining keystone CFG_IDs associated with the chosen keystone CID. In a sixth portion, system synthesis process 530 may choose the next keystone CID (e.g., the next of $K_0$ through $K_L$), and may repeat the first portion through the fifth portion for the remainder of the Keystone chiplets 510 (e.g., for the remainder of the keystone CIDs). Sample expanded configurations for system identification numbers SYS_0, SYS_1, and SYS_Y, corresponding with a keystone CFG_ID $KC_0$, are provided below.

| SYS_0: { | Kx, | $KC_0$; | |
| | $S_0$, | $SI2CC_0$; | |
| | ... ; | | |
| | $S_{B-1}$, | $SI2CC_{B-1}$; | |
| | $S_B$, | $SSPIC_B$; | |
| | ... ; | | |
| | $S_{A+B}$, | $SSPIC_{A+B}$ | } |
| SYS_1: { | Kx, | $KC_0$; | |
| | $S_{P-(A+B-1)}$, | $SI2CC_{P-(A+B-1)}$; | |
| | ... ; | | |
| | $S_{P-(B-2)}$, | $SI2CC_{P-(B-2)}$; | |
| | $S_{P-(B-1)}$, | $SSPIC_{P-(B-1)}$; | |
| | ... ; | | |
| | $S_{P-1}$, | $SSPIC_{P-1}$ | } |
| SYS_Y: { | Kx, | $KC_0$; | |
| | $S_{P-(A+B)}$, | $SI2CC_{P-(A+B)}$; | |
| | ... ; | | |
| | $S_{P-(B-1)}$, | $SI2CC_{P-(B-1)}$; | |
| | $S_{P-B}$, | $SSPIC_{P-B}$; | |
| | ... ; | | |
| | $S_P$, | $SSPIC_P$ | } |

Similar expanded configurations may exist for the remainder of the keystone CIDs (e.g., from $KC_1$ through $KC_R$).

In various embodiments, a keystone component may be an SoC. Sensors and memory components may be slaves, and an SoC may control each using a chosen communication protocol. Each component may have various possible wiring configurations (with corresponding identifiers (e.g., CFG_IDs)) available for building systems. Each CFG_ID may contain some or all information pertaining to selection in a unique system, such as functionality (e.g., whether a component is a keystone component or a slave component), slave information (e.g., a number of slaves, or a slave index), power management (PM) information, protocol information (e.g., I2C, SPI, etc.), and so forth.

In accordance with flow 300, flow 400, and/or HSS tool 500, an HSS tool as described herein may use a keystone component's CFG_ID as an anchor to begin system synthesis. From this CFG_ID, the HSS tool may decode various components for building a specific system, and may begin searching for candidate components. The HSS tool may calculate or determine one or more combinations, and may make a list of all possible systems (e.g., without any duplicates). For example, if a database has a total of P slaves available, and the protocols are determined to be (e.g., decoded as) one I2C protocol with A slaves and one SPI protocol with B slaves, a total number of systems may be calculated through a multinomial coefficient of P choose A and B.

In some embodiments, once the list is generated, the HSS tool may search a history table (e.g., a build history or database) for any previously-built systems, and may then build the remaining systems on the list, assigning a unique system identifier (e.g., a SYS_ID), which may contain both a CID and a chosen wiring configuration (e.g., a CFG_ID). Upon completion, all the systems may be added to a check table to prepare for full placement and routing on a silicon interposer, and for ERC checks, DRC checks, and/or checks of other checkers (as discussed herein). Pass/fail flags may be added to show the status of the system along the process. Failed systems may either be reconfigured for rechecking or discarded completely.

Once a system is built and passes all checks, it may be approved by a system designer, who may use the system as is, or may modify portions of the system as desired. If modified, the new system may be given a new unique SYS_ID (and may preferably be run through the same checks as prior to approval). All generated systems may be stored in a history table (e.g., a database) for the next round of builds. A user may then generate silicon interposer programming and/or mechanical collateral for any approved systems.

In some embodiments, other system information, such as SoC power management, may be independent of communication protocols. As a result, automation may be added in parallel and attached to the system at the end of the building process. Other building information (e.g., pertaining to voltage domains) which may impact a chosen component configuration (e.g., a CFG_ID) may be added to the builder in series. Once complete, one or more functional hardware systems may be presented to the end user. In some embodiments, the system may still wait for the completion of software verification and/or validation prior to building.

In various embodiments, with reference to flow 300, flow 400, and/or HSS tool 500, a method may comprise a processing, an establishing, and a determining. In some embodiments, machine readable storage media (as described here) may have executable instructions that, when executed, cause one or more processors to perform an operation comprising such methods.

In the processing, an inputted capabilities list including one or more hardware design capabilities may be processed. In the establishing, one or more candidate components for the one or more hardware design capabilities may be established. In the determining, a set of unique candidate netlists capable of satisfying the one or more hardware design capabilities may be determined, the set of unique candidate netlists being based upon the set of candidate components.

In some embodiments, the inputted capabilities list may comprise a sensor. For some embodiments, the unique candidate netlists may incorporate components interconnected via a silicon interposer. In some embodiments, the one or more candidate components include a microprocessor.

For some embodiments, the establishing may include one or more predetermined components (e.g. components identified by a user, such as by CID, to focus or limit the solution space or design space), and the unique candidate netlists may include the one or more predetermined components. In some embodiments, the one or more predetermined components may include a microprocessor (e.g., a keystone component). For some embodiments, the one or more candidate components support at least one communication protocol (such as I2C or SPI, or another communication protocol).

In some embodiments, the method may comprise an analyzing. In the analyzing, the set of unique candidate netlists may be based upon one or more solution space constraints to produce a corresponding set of rankings for the set of unique candidate netlists. For some embodiments, the solution space constraints may include a size constraint, a power constraint, a cost constraint, and/or a preferred-component constraint. In some embodiments, the method may comprise a verifying. In the verifying, the set of unique candidate netlists may be verified against one or more rule-sets. For some embodiments, the one or more rule-sets may include an ERC rule-set, a DRC rule-set, and/or another checker's rule-set.

In various embodiments, with reference to flow 300, flow 400, and/or HSS tool 500, a method may comprise a first processing, a second processing, a determining, and an analyzing. In some embodiments, machine readable storage media (as described here) may have executable instructions that, when executed, cause one or more processors to perform an operation comprising such methods.

In the first processing, an inputted capabilities list including one or more hardware design capabilities may be processed. In the second processing, an inputted set of system information may be processed, the inputted set of system information including one or more candidate components for the one or more hardware design capabilities and one or more solution space constraints. In the determining, a set of unique candidate netlists capable of satisfying the one or more hardware design capabilities may be determined, the set of unique candidate netlists being based upon the set of candidate components. In the analyzing, the set of unique candidate netlists may be analyzed based upon the one or more solution space constraints to produce a corresponding set of rankings for the set of unique candidate netlists.

In some embodiments, the unique candidate netlists may incorporate components interconnected via a silicon interposer. For some embodiments, the establishing may include one or more predetermined component, and the unique candidate netlists may include the one or more predetermined components. In some embodiments, the one or more candidate components may support at least one communication protocol. For some embodiments, the method may comprise a verifying. In the verifying, the set of unique candidate netlists may be verified against one or more rule-sets.

Some advantages of the HSS tool may accrue over time. As the HSS tool is used, and the HSS tool generates numerous supported systems at various stages of development (e.g., prototype, production, and so on), it may advantageously acquire increasingly-sophisticated data about various system configurations. Historical information related to the generated systems (e.g., via a history table) may be fed into the tool to provide a user with confidence indicators. For example, if one system has merely been built and tested under limited conditions in a lab, it may have a lower confidence rating than another equivalent system which has been shipped in high volume. Such information may assist a user in choosing a system with a higher probability of functioning, and may also show patterns of acceptable component pairings.

Over time, the HSS tool or a user may recognize that a specific component pairing or combination has faulty behavior and should be avoided to increase the likelihood of a successful build. A similar analysis may also be applied with respect to cost. Hardware systems built and shipped in previous products may cost less than systems which have not yet undergone high volume validation, and such information may be provided to a user as well.

Accordingly, the mechanisms and methods disclosed herein may advantageously provide as many valid hardware systems to a user as possible, with as much corresponding information as possible, to improve the decision as to which system best fits the user's need.

Figure 6:
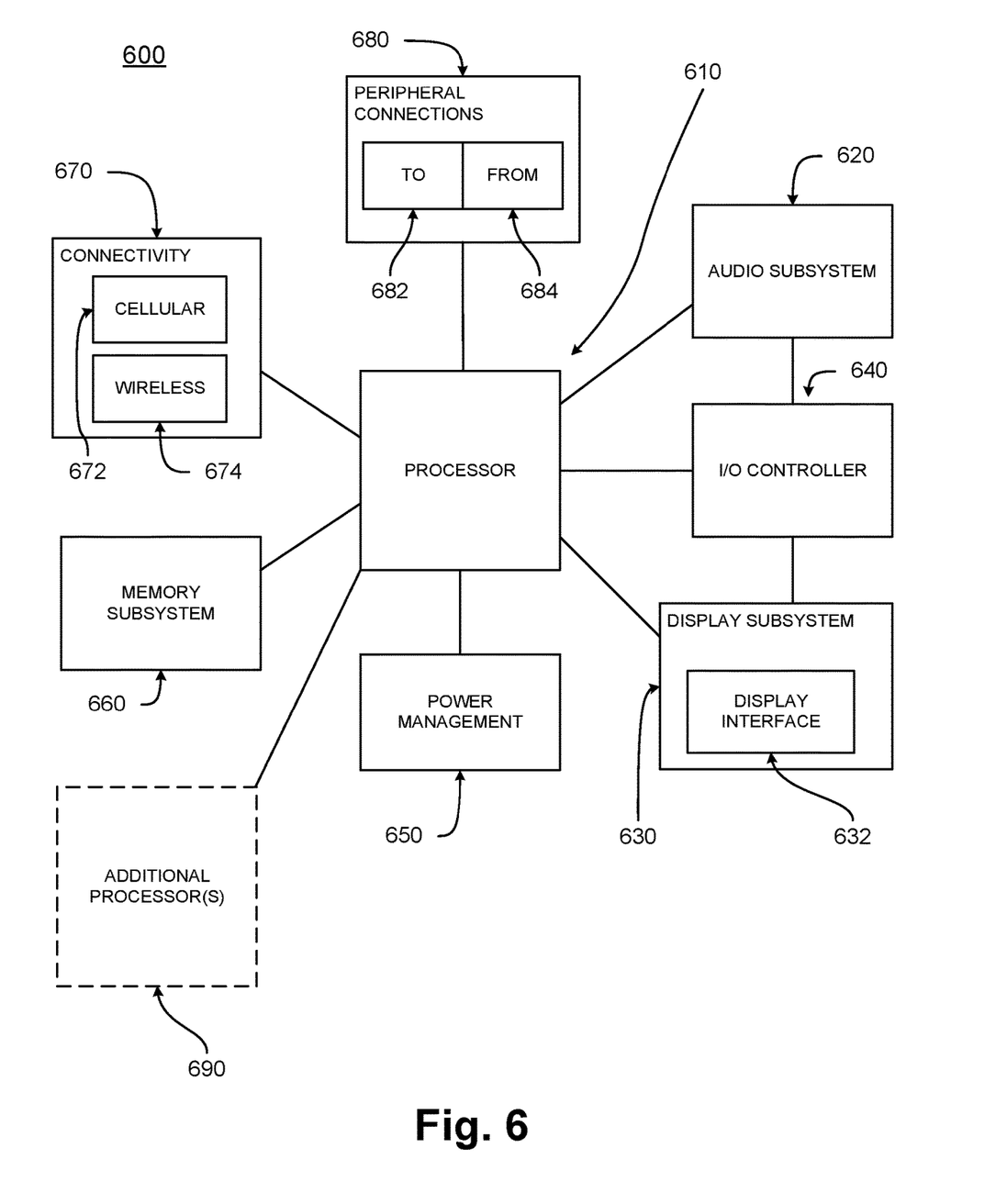
FIG. 6 illustrates a computing device with mechanisms for HSS, in accordance with some embodiments of the disclosure.

FIG. 6 illustrates a computing device with mechanisms for HSS, in accordance with some embodiments of the disclosure. Computing device 600 may be a computer system, a System-on-a-Chip (SoC), a tablet, a mobile device, a smart device, an IoT device, a wearable device, or a smart phone with mechanisms for HSS, in accordance with some embodiments of the disclosure. It will be understood that certain components of computing device 600 are shown generally, and not all components of such a device are shown FIG. 6. Moreover, while some of the components may be physically separate, others may be integrated within the same physical package, or even on the same physical silicon die. Accordingly, the separation between the various components as depicted in FIG. 6 may not be physical in some cases, but may instead be a functional separation. It is also pointed out that those elements of FIG. 6 having the same names or reference numbers as the elements of any other figure can operate or function in any manner similar to that described, but are not limited to such.

In various embodiments, the components of computing device 600 may include any of a processor 610, an audio subsystem 620, a display subsystem 630, an I/O controller 640, a power management component 650, a memory subsystem 660, a connectivity component 670, one or more peripheral connections 680, and one or more additional processors 690. In some embodiments, processor 610 may include mechanisms for HSS, in accordance with some embodiments of the disclosure. In various embodiments, however, any of the components of computing device 600 may include mechanisms for HSS, in accordance with some embodiments of the disclosure. In addition, one or more components of computing device 600 may include an interconnect fabric having a plurality of ports, such as a router, a network of routers, or a Network-on-a-Chip (NoC).

Processor 610 may be a general-purpose processor or CPU (Central Processing Unit). In some embodiments, processor 610 may include one or more physical devices, such as microprocessors, application processors, microcontrollers, programmable logic devices, or other processing means. The processing operations performed by processor 610 may include the execution of an operating platform or operating system on which applications and/or device functions may then be executed. The processing operations may also include operations related to one or more of the following: audio I/O; display I/O; power management; connecting computing device 600 to another device; and/or I/O (input/output) with a human user or with other devices.

Audio subsystem 620 may include hardware components (e.g., audio hardware and audio circuits) and software components (e.g., drivers and/or codecs) associated with providing audio functions to computing device 600. Audio functions can include speaker and/or headphone output as well as microphone input. Devices for such functions can be integrated into computing device 600, or connected to computing device 600. In one embodiment, a user interacts with computing device 600 by providing audio commands that are received and processed by processor 610.

Display subsystem 630 may include hardware components (e.g., display devices) and software components (e.g., drivers) that provide a visual and/or tactile display for a user to interact with computing device 600. Display subsystem 630 may include a display interface 632, which may be a particular screen or hardware device used to provide a display to a user. In one embodiment, display interface 632 includes logic separate from processor 610 to perform at least some processing related to the display. In some embodiments, display subsystem 630 includes a touch screen (or touch pad) device that provides both output and input to a user.

I/O controller 640 may include hardware devices and software components related to interaction with a user. I/O controller 640 may be operable to manage hardware that is part of audio subsystem 620 and/or display subsystem 630. Additionally, I/O controller 640 may be a connection point for additional devices that connect to computing device 600, through which a user might interact with the system. For example, devices that can be attached to computing device 600 might include microphone devices, speaker or stereo systems, video systems or other display devices, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of computing device 600. Additionally, audio output can be provided instead of, or in addition to, display output. In another example, if display subsystem 630 includes a touch screen, the display device may also act as an input device, which can be at least partially managed by I/O controller 640. There can also be additional buttons or switches on computing device 600 to provide I/O functions managed by I/O controller 640.

In some embodiments, I/O controller 640 manages devices such as accelerometers, cameras, light sensors or other environmental sensors, or other hardware that can be included in computing device 600. The input can be part of direct user interaction, and may provide environmental input to the system to influence its operations (such as filtering for noise, adjusting displays for brightness detection, applying a flash for a camera, or other features).

Power management component 650 may include hardware components (e.g., power management devices and/or circuitry) and software components (e.g., drivers and/or firmware) associated with managing battery power usage, battery charging, and features related to power saving operation.

Memory subsystem 660 may include one or more memory devices for storing information in computing device 600. Memory subsystem 660 can include nonvolatile memory devices (whose state does not change if power to the memory device is interrupted) and/or volatile memory devices (whose state is indeterminate if power to the memory device is interrupted). Memory subsystem 660 can store application data, user data, music, photos, documents, or other data, as well as system data (whether long-term or temporary) related to the execution of the applications and functions of computing device 600.

Some portion of memory subsystem 660 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 670 may include a network interface, such as a cellular interface 672 or a wireless interface 674 (so that an embodiment of computing device 600 may be incorporated into a wireless device such as a cellular phone or a personal digital assistant). In some embodiments, connectivity component 670 includes hardware devices (e.g., wireless and/or wired connectors and communication hardware) and software components (e.g., drivers and/or protocol stacks) to enable computing device 600 to communicate with external devices. Computing device 600 could include separate devices, such as other computing devices, wireless access points or base stations, as well as peripherals such as headsets, printers, or other devices.

In some embodiments, connectivity component 670 can include multiple different types of network interfaces, such as one or more wireless interfaces for allowing processor 610 to communicate with another device. To generalize, computing device 600 is illustrated with cellular interface 672 and wireless interface 674. Cellular interface 672 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 674 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 680 may include hardware interfaces and connectors, as well as software components (e.g., drivers and/or protocol stacks) to make peripheral connections. It will be understood that computing device 600 could both be a peripheral device to other computing devices (via "to" 682), as well as have peripheral devices connected to it (via "from" 684). The computing device 600 may have a "docking" connector to connect to other computing devices for purposes such as managing content on computing device 600 (e.g., downloading and/or uploading, changing, synchronizing). Additionally, a docking connector can allow computing device 600 to connect to certain peripherals that allow computing device 600 to control content output, for example, to audiovisual or other systems.

In addition to a proprietary docking connector or other proprietary connection hardware, computing device 600 can make peripheral connections 680 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A method comprising:
    identifying a first set of possible combinations of a first communication protocol based components associated with one or more candidate components, wherein identifying the first set of possible combinations of the first communication protocol based components, results in a first identified set of possible combinations of the first communication protocol based components;

identifying a second set of possible combinations of a second communication protocol based components associated with the one or more candidate components, wherein identifying the second set of possible combinations of the second communication protocol based components, results in a second identified set of possible combinations of the second communication protocol based components; and generating a set of unique systems by performing a cross-product of the first identified set of possible combinations and the second identified set of possible combinations.

2. The method of claim 1, wherein the first communication protocol comprises I2C.

3. The method of claim 1, wherein the second communication protocol comprises SPI.

4. The method of claim 1, further comprising:
updating a counter parameter based on performing the cross-product; and
comparing the counter parameter with a number of one or more candidate components, wherein the number of one or more candidate components indicates a size of a list of the one or more candidate components.

5. The method of claim 4, wherein the first identified set of possible combinations of the first communication protocol based components are first slave components, wherein the second identified set of possible combinations of the second communication protocol based components are second slave components, wherein the one or more candidate components include a first master component of the first slave components, and/or wherein the one or more candidate components include a second master component of the second slave components.

6. The method of claim 4 comprising:
receiving system information with one or more desired capabilities of a system; and
generating the list of the one or more candidate components that meet the one or more desired capabilities.

7. The method of claim 6, wherein the one or more desired capabilities include one or more of:
a type of system,
a number and/or type of sensors of the system,
communication protocols used by the system,
a desired microprocessor for the system,
desired voltage supplies for the system,
desired clocking parameters for the system,
desired power supply support for the system,
power targets for the system,
a delivery schedule impact for the system,
a lab verification impact for the system,
a product implementation history for the system, or
cost, size, and/or user component preferences for the system.

8. The method of claim 6 comprising:
determining whether the first communication protocol and/or the second communication protocol are to be supported for the one or more desired capabilities.

9. The method of claim 8, wherein identifying the first set of possible combinations of the first communication protocol based components, and identifying the second set of possible combinations of the second communication protocol based components, are based on determining whether the first communication protocol and/or the second communication protocol are to be supported for the one or more desired capabilities.

10. The method of claim 6 comprising:
determining a set of unique candidate netlists capable of satisfying the one or more desired capabilities, the set of unique candidate netlists being based upon the one or more candidate components.

11. The method of claim 10, comprising:
sending one or more systems that satisfy the one or more desired capabilities to a rule checker if the counter parameter is greater than the number of one or more candidate components.

12. The method of claim 11, wherein the rule checker includes one or more of: DRC, ERC, thermal rule checker, power rule checker, timing checker, or noise checker.

13. The method of claim 1, wherein the one or more candidate components are interconnected via a programmable silicon interposer.

14. The method of claim 13, wherein the programmable silicon interposer includes at least one integrated circuit.

15. A machine-readable storage media having machine-readable instructions stored there on, that when executed, cause one or more machines to perform a method comprising:
identifying a first set of possible combinations of a first communication protocol based components associated with one or more candidate components, wherein identifying the first set of possible combinations of the first communication protocol based components, results in a first identified set of possible combination of the first communication protocol based components;
identifying a second set of possible combinations of a second communication protocol based components associated with the one or more candidate components, wherein identifying the second set of possible combinations of the second communication protocol based components, results in a second identified set of possible combinations of the second communication protocol based components; and
generating a set of unique systems by performing a cross-product of the first identified set and the second identified set.

16. The machine-readable storage media of claim 15, wherein the first communication protocol comprises I2C.

17. The machine-readable storage media of claim 15, wherein the second communication protocol comprises SPI.

18. The machine-readable storage media of claim 15, wherein the method further comprising:
updating a counter parameter based on performing the cross-product; and
comparing the counter parameter with a number of one or more candidate components, wherein the number of one or more candidate components indicates a size of a list of the one or more candidate components.

19. A system comprising:
a memory to store instructions for hardware system synthesis;
a processor coupled to the memory; and
a communication interface coupled to the processor, wherein the processor is to execute the instructions to:
identify a first set of possible combinations of a first communication protocol based components associated with one or more candidate components, wherein to identify the first set of possible combinations of the first communication protocol based components, results in a first identified set of possible combinations of the first communication protocol based components;
identify a second set of possible combinations of a second communication protocol based components associated with the one or more candidate components, wherein to identify the second set of possible combinations of the second communication protocol based components, results in a second identified set of possible combinations of the second communication protocol based components; and perform a cross-product of the first identified set of possible combinations of the first communication protocol based components and the second identified set of possible combinations of the second communication protocol based components.

20. The system of claim 19, wherein the one or more candidate components are interconnected via a programmable silicon interposer, wherein the programmable silicon interposer includes at least one integrated circuit.

* * * * *